(12) United States Patent
Xu

(10) Patent No.: US 10,576,568 B2
(45) Date of Patent: Mar. 3, 2020

(54) GANTRY CUTTING MACHINE FOR PIPE AND FLAT PLATE

(71) Applicant: JIANGSU ZHENGHE HEAVY INDUSTRY CO., LTD, Kunshan (CN)

(72) Inventor: Li Xu, Kunshan (CN)

(73) Assignee: JIANGSU ZHENGHE HEAVY INDUSTRY CO., LTD, Kunshan (CN)

( * ) Notice: Subject to any disclaimer, the term of this patent is extended or adjusted under 35 U.S.C. 154(b) by 185 days.

(21) Appl. No.: 15/920,416

(22) Filed: Mar. 13, 2018

(65) Prior Publication Data

US 2018/0200822 A1 Jul. 19, 2018

(30) Foreign Application Priority Data

Jan. 9, 2018 (CN) .......................... 2018 1 0020257

(51) Int. Cl.
| | |
|---|---|
| *B23K 10/00* | (2006.01) |
| *B23K 7/00* | (2006.01) |
| *B23K 7/10* | (2006.01) |
| *B23K 37/02* | (2006.01) |
| *B23K 37/04* | (2006.01) |
| *H05H 1/34* | (2006.01) |
| *B23K 101/28* | (2006.01) |

(52) U.S. Cl.
CPC .............. *B23K 7/006* (2013.01); *B23K 7/102* (2013.01); *B23K 10/00* (2013.01); *B23K 37/0211* (2013.01); *B23K 37/0235* (2013.01); *B23K 37/0241* (2013.01); *B23K 37/0247* (2013.01); *B23K 37/0276* (2013.01); *B23K 37/0288* (2013.01); *B23K 37/0435* (2013.01); *B23K 2101/28* (2018.08)

(58) Field of Classification Search
CPC ........ B33K 7/007; B23K 7/102; B23K 10/00; B23K 37/0211; B23K 37/0235; B23K 37/10277; B23K 37/10276; B23K 37/10288; B23K 371/0435; B23K 37/0128; H05H 1/26; H05H 1/34
USPC ....... 219/121.39, 121.48, 121.56, 121.58, 75
See application file for complete search history.

(56) References Cited

U.S. PATENT DOCUMENTS 3,614,077 A * 10/1971 Blackburn ............. B23K 7/006
266/57
4,806,726 A * 2/1989 Rosa ...................... B21D 53/88
219/121.39

(Continued)

*Primary Examiner* — Mark H Paschall
(74) *Attorney, Agent, or Firm* — Bayramoglu Law Offices LLC

(57) ABSTRACT

The present invention discloses a gantry cutting machine for pipe and flat plate, including a cutting assembly, a plate cutting mechanism, a pipe cutting mechanism and a crossbeam. The crossbeam is provided with a transverse driving unit. The cutting assembly is connected to the crossbeam. A cutting assembly mounting base is provided with a lifting-driving unit. The transverse driving unit includes a first gear, a first rack, a first motor and a first rail. The present invention provides a gantry cutting machine for pipe and flat plate to meet the demands in the field of numerically controlled cutting and machining of pipe products, which has a simple operation and is easy to use, and the clamping is flexible, so that the processing cost of pipe products can be reduced, and cutting and machining range of the numerically controlled cutting machine can be broadened.

12 Claims, 13 Drawing Sheets

(56) References Cited

U.S. PATENT DOCUMENTS

| | | | |
|---|---|---|---|
| 2008/0135531 A1* | 6/2008 | Widmann | B23K 26/0823 219/121.72 |
| 2013/0193125 A1* | 8/2013 | Nishiyama | B23K 26/0823 219/121.85 |
| 2019/0160604 A1* | 5/2019 | Weinberg | B23K 37/0276 |

* cited by examiner

GANTRY CUTTING MACHINE FOR PIPE AND FLAT PLATE

CROSS REFERENCE TO RELATED APPLICATIONS

This application is based upon and claims priority to Chinese Patent Application No. 201810020257.1, filed on Jan. 9, 2018, the entire contents of which are incorporated herein by reference.

TECHNICAL FILED

The present invention relates to a technical filed of cutting equipment, particularly to a gantry cutting machine for pipes and flat plates.

BACKGROUND

In the field of plasma processing, plasma processing equipment is mainly used for plate material processing, which has advantages of easy cutting and simple operation and control. According to processing demands of different products, the part processing of various angles, colors and shapes of arc can be completed by the support of the numerical control system, so that the deficiencies of numerically controlled lathe processing can be eliminated. Therefore, plasma processing equipment is well received by the majority of plate material processing enterprises.

Since the plasma processing technology is well developed, stable, easy to use, and has low requirement for operators, the application scope of the products processed by the plasma processing technology is gradually expanding, and the processing types are developing to a diversified direction. For example, the plate material processing enterprises often encounter with the processing of various pipe products relative to the plate material processing. In the past, grinder or electric welding machine was mainly used for cutting in the processing of pipe products which causes rough cutting surface, low efficiency and poor precision and could not meet the processing demands of industry. With the development of numerical control technology, numerically controlled pipe cutting has become a trend of pipe product processing. However, a separate design of numerically controlled pipe cutting machine is not cost-effective and has a narrow application, and thus is adverse to the promotion and use in the enterprises. Therefore, to combine cutting machine and numerically controlled cutting machine and develop a brand-new integrated numerically controlled cutting & pipe cutting machine has become the problem to be solved by the present invention.

SUMMARY OF THE INVENTION

The main technical problems to be solved by the present invention are to provide a gantry cutting machine for pipe and flat plate to meet the demands of pipe product processing in the processing field of numerical control cutting, which is simple in operation and control, easy to use, flexible in installation and clamping, can reduce the processing cost of pipe products, improve the accuracy of pipe product processing, and broaden the cutting processing scope of numerically controlled cutting machine.

In order to solve the foregoing technical problems, the technical solution provided by the present invention is as follows. A gantry cutting machine for pipes and flat plates includes at least one cutting assembly, a plate material cutting mechanism, a pipe cutting mechanism for cutting rectangular pipes, and a crossbeam. The plate cutting mechanism and the pipe cutting mechanism are arranged side by side, the crossbeam is located above the plate cutting mechanism and the pipe cutting mechanism, and an end provided with a cutting torch is defined as a front end.

The crossbeam is provided with a transverse driving unit for driving the cutting assembly to move along a length direction of the crossbeam, the cutting assembly is connected to the crossbeam through a cutting assembly mounting base, and the cutting assembly mounting base is provided with a lifting-driving unit for driving the cutting assembly to move up and down.

The transverse driving unit includes a first gear, a first rack, a first motor, and a first rail. The first gear and the first rack are engaged with each other, the first rack and the first rail are both disposed on the crossbeam along a length of the crossbeam, an output shaft of the first motor is connected to an input end of the first gear, and the first motor drives the first gear to rotate along the first rack, so as to drive the cutting assembly mounting base to slide along the first rail.

The plate cutting mechanism includes a machine frame, a machine platform and a vertical driving unit for driving the machine frame to move along a length direction of the machine platform. The machine frame includes a main machine frame and a sub machine frame, the main machine frame and the sub machine frame are located above the machine platform, two ends of the crossbeam are fixedly connected to the main machine frame and the sub machine frame, respectively, and one end of the crossbeam is extended to a position above the pipe cutting mechanism. The vertical driving unit is arranged on the machine frame.

The vertical driving unit includes a second gear, a second rack, a second rail and a second motor. The second rack and the second rail are arranged on the machine platform, the second gear is arranged at a lower end of the machine frame, the second gear is connected to an output shaft of the second motor, and the second motor drives the machine frame to move along the second rail.

The pipe cutting mechanism includes a material-loading rail, an end chuck, a moving chuck and a material-loading driving unit. The end chuck is fixedly connected to one end of the material-loading rail, the moving chuck is connected to the material-loading rail through the material-loading driving unit and moves along a length direction of the material-loading rail, and the end chuck and the moving chuck are arranged coaxially. When the pipe is cut, one end of the pipe is snapped in the end chuck and the other end of the pipe is snapped in the moving chuck.

The end chuck and the moving chuck each comprises two clamping parts configured for clamping the pipe, a clamping part mounting base and a chuck body. The two clamping parts are symmetrically arranged on both sides of the pipe and fixedly connected to the chuck body, respectively, the pipe is clamped when the two clamping parts move close to the pipe at the same time. Each clamping part includes a clamping claw in contact with the pipe and a clamping arm fixedly connected to the clamping claw. The clamping arm is connected to the clamping part mounting base, the clamping part mounting base is fixedly connected to the chuck body. Two ends of the clamping claw are respectively provided with a clamping roller, the two clamping rollers are arranged at an angle of 90 degrees. One end of the clamping roller is connected to the clamping claw and the other end is connected to the clamping arm. When the pipe is cut, the pipe is located between the two clamping rollers and is enabled to slide between the two clamping rollers.

Further, two cutting assemblies are provided and both are arranged on the cutting assembly mounting base, and the cutting assemblies are a turret cutting assembly, a three torch cutting assembly or a parallelogram linkage assembly, respectively.

Further, the turret cutting assembly includes a cutting torch, a swing mechanism for driving the cutting torch to swing toward the left and the right, a rotating mechanism for driving the cutting torch to rotate, a turret lifting mechanism for driving the cutting torch to move up and down, and a rotating bracket. An upper end of the rotating bracket is rotatably connected to the rotating mechanism and a lower end of the rotating bracket is fixedly connected to the swing mechanism. The swing mechanism is located behind the cutting torch. The rotating mechanism is located above the swing mechanism. The turret lifting mechanism is located behind the rotating mechanism. The swing mechanism includes a swing motor, an arcuate rail, a third gear, and a third rack engaged with the third gear. The swing motor is located above the arcuate rail, the cutting torch is connected to the arcuate rail through a cutting torch mounting base, the arcuate rail is located between the swing motor and the cutting torch, and the third rack is mounted in the arcuate rail along a length direction of the arcuate rail. The third gear is disposed at an output end of the swing motor, and the swing motor drives the third gear to rotate along the third rack to drive the cutting torch to swing toward the left and the right. The rotating mechanism includes a rotating motor and a gear set. The gear set includes a main gear and a pinion, and the main gear and the pinion are engaged with each other. The pinion is connected to an output end of the rotating motor, the main gear is connected to an upper end of the rotating bracket. The rotating motor drives the pinion to drive the rotating bracket to rotate, so as to drive the cutting torch to rotate around the axis of the main gear. The turret lifting mechanism includes a turret lifting motor and a ball screw. The ball screw includes a third screw and a third nut. The turret lifting motor is fixedly connected to the third screw. A mounting base of the rotating mechanism is fixedly connected to the third nut. The turret lifting motor drives the third screw to rotate, so as to drive the third nut to move up and down, and further to drive the rotating mechanism to move up and down. The rotating mechanism is provided with a rotation limiting device, and the swing mechanism is provided with a swing limiting device.

Further, the rotation limiting device includes a first mechanical limiting block and a first photoelectric inductive switch, two first mechanical limiting blocks are provided and are symmetrically arranged on the left and right sides of the main gear, respectively, two first photoelectric inductive switches are disposed between the two first mechanical limiting blocks, and the two first photoelectric inductive switches are arranged close to the first mechanical limiting blocks on two sides, respectively.

Further, the swing limiting device includes a second mechanical limiting block and a second photoelectric inductive switch, and two second mechanical limiting blocks are provided and symmetrically arranged at left and right ends of the arcuate rail, respectively. Two second photoelectric inductive switches are disposed between the two second mechanical limiting blocks, and the two second photoelectric inductive switches are arranged close to the second mechanical limiting blocks on two sides, respectively.

Further, the cutting torch mounting base is magnetically connected to the arcuate rail.

Further, the third gear of the swing mechanism is a bevel gear.

Further, a rotating assembly cable support bracket is provided at an upper end of the rotating bracket and below the rotating mechanism, and the rotating assembly cable support bracket protrudes forward.

Further, a corrugated dustproof cover is provided at a side where the turret lifting mechanism fixing base contacts the rotating mechanism mounting base, an upper end of the corrugated dustproof cover is connected to the rotating mechanism mounting base, and the lower end of the corrugated dustproof cover is connected to the turret lifting mechanism fixing base.

Further, the three torch cutting assembly includes a hollow main shaft and a cutting torch. Three cutting torches are provided including a left cutting torch, a middle cutting torch and a right cutting torch, from left to right. The left cutting torch and the right cutting torch are respectively connected to the main shaft through a left connecting mechanism and a right connecting mechanism, and the middle cutting torch is connected to the main shaft through a middle connecting mechanism. Each of the front ends of the left connecting mechanism, the right connecting mechanism and the middle connecting mechanism is provided with a three-cutting-torch lifting mechanism for driving the cutting torches to move up and down. The left connecting mechanism and the right connecting mechanism further respectively include a deflection mechanism for driving the cutting torch to deflect at an angle and a translation mechanism for driving the cutting torch to move to the left and right. The deflection mechanism is disposed behind the cutting torch, and the translation mechanism is disposed above the deflection mechanism.

Further, the left connecting mechanism, the right connecting mechanism and the middle connecting mechanism each includes a connecting shaft and a connecting base. A front end of the connecting shaft is connected to the cutting torch, a rear end of the connecting shaft is connected to the connecting base, and an upper end of the connecting base is connected to the main shaft.

Further, the three-cutting-torch lifting mechanism includes a fourth gear a fourth rack and a lifting adjusting knob, wherein the fourth gear and the fourth gear rack are engaged with each other. The lifting adjusting knob is fixedly connected to the fourth gear, the fourth rack is disposed on the cutting torch along a length direction of the cutting torch. The fourth gear is disposed on the clamping part located at a front end of the connecting shaft, and the lifting adjusting knob drives the cutting torch to move up and down by adjusting a forward or reverse rotation of the fourth gear.

Further, the left connecting mechanism and the right connecting mechanism each includes a connecting shaft and a connecting base. A front end of the connecting shaft is connected to the cutting torch, a rear end of the connecting shaft is connected to the connecting base, an upper end of the connecting base is provided with a connecting hole, and the main shaft is slidably connected to the connecting base through the connecting hole of the connecting base.

Further, the deflection mechanism includes a worm gear, a worm screw and a deflection adjusting knob, wherein the worm gear and the worm screw are engaged with each other, the worm gear is arranged at a rear end of the connecting shaft, the worm screw is arranged at the rear end and the upper end of the connecting shaft. One end of the worm screw is fixedly connected to the deflection adjusting knob, and the deflection adjusting knob drives the cutting torch to deflect at an angle toward the left and the right by adjusting the forward or reverse rotation of the worm screw.

Further, the translation mechanism includes a screw rod, a nut and a translation adjusting knob, wherein the screw rod and the nut are engaged with each other. One end of the screw rod extends into an interior of the main shaft and the other end of the screw rod is fixedly connected to the externally arranged translation adjusting knob. The translation adjusting knob drives the cutting torch to move leftward and rightward by adjusting the forward or reverse rotation of the screw rod.

Further, the connecting base is provided with a tightening device, the tightening device includes a tightening screw and a tightening knob.

Further, an upper end of the connecting base is provided with a tightening screw hole extending from an upper end surface of the connecting base downwardly to the connecting hole, an upper end of the tightening screw is fixedly connected to the tightening knob, the lower end of the tightening screw passes through the tightening screw hole. During the tightening, the tightening screw closely contacts against an upper surface of the main shaft by rotating the tightening knob.

Further, a rear end of the three-cutting-torch cutting assembly is connected to a mechanical height adjusting assembly. The mechanical height adjusting assembly includes a height adjusting assembly main frame, an upper end of the height adjusting assembly main frame is provided with a height adjusting assembly mounting seat and the lower end of the height adjusting assembly main frame is provided with a height adjusting assembly roller.

Further, the height adjusting assembly mounting seat includes a height adjusting assembly base and a height adjusting assembly slider, the height adjusting assembly base includes an upper baseplate, a lower baseplate and a height adjusting assembly fixing plate, wherein the height adjusting assembly fixing plate is located between the upper baseplate and the lower baseplate, and is integrally connected to the upper baseplate and the lower baseplate. The left and right sides of height adjusting assembly fixing plate are respectively provided with an optical axis. An upper end of the optical axis is integrally connected to the upper baseplate, and a lower end of the optical axis is integrally connected to the lower baseplate. The optical axis is sleeved with the height adjusting assembly slider and a spring. An upper end of the spring is connected to the height adjusting assembly slider and the lower end of the spring is connected to the lower baseplate.

Further, a rear portion of the height adjusting assembly mounting seat is provided with a rear portion connecting shaft connected to a machine tool, the rear portion connecting shaft is integrally connected to the height adjusting assembly sliders of the optical axes located at the left and right sides, respectively.

Further, a left side of the adjusting assembly mounting seat is provided with a handle, and when the cutting is completed, the height of the cutting torch is fixed by compressing the spring through the handle.

Further, upper surfaces of two ends of the main shaft are provided with scale areas extending from the two ends to the middle part until reaches the middle connecting mechanism, and the scale areas are provided with scale marks.

More specifically, the scale areas are planar.

Further, a rear end of the parallelogram linkage assembly is connected to a main frame, a rear end of the main frame is connected to a base panel, a front portion of the parallelogram linkage assembly is connected to the cutting torch, and the base panel is connected to a driving motor for driving the parallelogram linkage assembly to rotate.

Further, one side of the parallelogram linkage assembly is provided with a tracking frame parallel with the main frame, the tracking frame is connected to a fixed arm assembly and is enabled to move long a direction parallel to the main frame, and an end of the tracking frame near the pipe is provided with a second photoelectric inductive sensor.

Further, a driven front-upper end of the parallelogram linkage assembly is provided with a linkage assembly cable auxiliary bracket for winding cables of the cutting torch.

Further, a tail end of the clamping arm is provided with an arcuate groove for adjusting an angle of the clamping arm, and the clamping arm realizes the connection with the clamping part mounting base by locking the arcuate groove through the first screw.

Further, the driving manner of the lifting-driving unit is a gear-rack transmission.

Further, the material-loading driving unit includes a material-loading driving gear, a material-loading driving rack and a material-loading driving motor, the material-loading driving rack is arranged on the material-loading rail, the material-loading driving gear is arranged on a lower end of the moving chuck. The material-loading driving gear is connected to the output shaft of the material-loading driving motor, and the material-loading driving motor drives the moving chuck to move along the material-loading rail.

Further, the cutting torch is a plasma cutting torch or a flame cutting torch.

Further, the main machine frame is arranged on the machine platform and located at a side near the pipe cutting mechanism, and the main machine frame is provided with a main console.

Further, a manner used in the rotation of the end chuck and the moving chuck is gear transmission.

Further, gear transmission structures of the end chuck and the moving chuck are respectively connected to a synchronous motor.

Further, the manner used in a rotary connection between the main frame and the parallelogram linkage assembly is a worm gear and worm screw transmission.

Further, one cutting assembly mounting base is provided, and each the cutting assembly is mounted on the cutting assembly mounting base.

Further, at least one cutting assembly mounting base is provided, each of the cutting assembly mounting bases is correspondingly provided with a cutting assembly; each of the cutting assemblies is respectively connected to a first gear and a first motor that drive the cutting assembly mounting base to move along the crossbeam, and a lifting-driving unit that drives the cutting assembly to move up and down.

Further, two first rails are provided and are arranged on the same side of the crossbeam, a rear end of the cutting assembly mounting base is provided with a first roller matched with the first rail, the cutting assembly mounting base is snapped in the first rail through the first roller so that the first motor drives the cutting assembly mounting base to move along the length direction of the crossbeam.

Further, a control system is provided. The cutting torch, the first motor, the second motor, the swing motor, the rotating motor, the turret lifting motor, the material-loading driving motor, the driving motor and the synchronous motor are electrically connected to the control system, respectively.

The present invention has at least the following advantages.

For the flat plate cutting: the metal plate material to be cut is placed on the work bench, then start the cutting machine, under the control of the control system, the second motor of the vertical driving unit drives the crossbeam to drive the cutting assembly to move along the second rail, and the first motor of the transverse driving unit drives the cutting assembly mounting base to drive the cutting assembly to move along the first rail until to a position above the metal plate; the lifting-driving unit drives the cutting assembly to move up and down, so a flexible three-dimensional cutting of work pieces is realized, and the structure is stable and secure with a high degree of automation.

For the pipe cutting: after the pipe is snapped in the end chuck and the moving chuck, the cutting machine is started, under the control of the control system, the second motor of the vertical driving unit drives the crossbeam to drive the cutting assembly to move along the second rail, the first motor of the transverse driving unit drives the cutting assembly mounting base to drive the cutting assembly to move along the first rail until to a position above the pipe, then, the orientation and angle of the cutting assembly is adjusted to cut the pipe. The material-loading driving unit automatically delivers the pipe material until the pipe cutting is completed. The present invention has the advantages such as high cutting efficiency, smooth cut, high cutting efficiency, and the structure is stable and secure with a high degree of automation. Therefore, the present invention has at least the following advantages.

1. The cutting machine of the present invention includes a plate cutting mechanism and a pipe cutting mechanism. With the design of a relatively independent pipe cutting mechanism to cooperate with the existing flat plate numerically controlled cutting machine, the purposes of plate cutting and pipe cutting can be achieved on one cutting machine, such that not only the cutting of different metal materials can be realized, but also the cutting accuracy and the usage efficiency of numerically controlled cutting machine are improved, so the cutting machine is full-featured, has wide range of use, and can reduce the production costs of enterprises.

2. In the present invention, the pipe cutting mechanism includes material-loading rail, end chuck, moving chuck and material-loading driving unit. The end chuck and the moving chuck are arranged coaxially. When a pipe is cut, one end of the pipe is clamped at the end chuck, and the other end of the pipe is snapped in the moving chuck. Moreover, the annular body of the end chuck and the moving chuck are respectively connected to a synchronous motor. When the other surfaces of the pipe need cutting, the end chuck and the moving chuck may be synchronously rotated to cut the other surfaces, so the design is reasonably easy to use.

3. In the present invention, the end chuck and the moving chuck each includes two clamping parts for clamping the pipe material, the two clamping parts are symmetrically arranged on both sides of the pipe material, and when the two clamping parts simultaneously move close to the pipe material, the pipe is clamped to prevent the pipe from rotating during cutting, affecting the cutting precision, and even worse damaging the pipe and resulting in waste. The clamping part includes a clamping claw and a clamping arm. Two ends of the clamping claw are respectively provided with a clamping roller, and the two clamping rollers are arranged at an angle of 90 degrees. During the cutting, the pipe is located between the two clamping rollers and is enabled to slide between the two clamping rollers. The design of clamping claws makes the pipe clamped without affecting the conveying of the pipe while cutting the pipe, so the design is reasonable and convenient for use. The rear end of the clamping arm is provided with an arcuate groove for adjusting the angle of the clamping arm, the deflection angle adjustment of the clamping arm is realized by locking the arcuate groove at different positions through the first screw rod. The design of the clamping part is fit for cutting rectangular pipes with various specifications and has a wide processing range.

4. In the present invention, at least one cutting assembly mounting base is provided. When a plurality of cutting assembly mounting bases are provided, each cutting assembly mounting base is correspondingly provided with a cutting assembly, and each cutting assembly is connected to a separate transverse driving unit and a separate lifting-driving unit, so as to realize a separate operation or a synchronous operation of the cutting assemblies, thus, the present invention has good flexibility and practicality with a wide processing range.

5. In the present invention, the cutting assembly may be a turret cutting assembly, a three-cutting-torch cutting assembly or a parallelogram linkage assembly. The cutting assembly may be installed according to the cutting demands to achieve a flexible cutting under different requirements, so the design is reasonable and has a wide processing range.

6. In the present invention, the transverse driving unit is provided with two first rails and both the rails are arranged on the same side of the crossbeam. The cutting assembly mounting base is provided with rollers matched with the first rails. The cutting assembly mounting base is snapped to the first rail through the rollers and is driven by the first motor to move along the length direction of the crossbeam. The cutting assembly mounting base moves on the first rail through the rollers, so the present invention has good stability, and the cutting torch is positioned accurately. Compared with sliders, the rollers can achieve the same effect while have lower cost.

7. In the present invention, the turret cutting assembly can quickly realize an automatic cutting of bevels with angle changes at one time, so that the present invention has a high degree of automation, simple processing steps, and low labor intensity. Moreover, the one-time cutting ensures the bevel cutting quality of the products. The turret lifting mechanism uses ball screw drive and the swing mechanism uses gear-rack drive. Compared with the traditional chain and sprocket mechanism, the present invention is durable, nonperishable, easy to maintain, and has a long service life.

8. In the present invention, a corrugated dustproof cover is provided on the side where the mounting base of the turret cutting assembly is in contact with the rotating mechanism mounting base. The upper end of the corrugated dustproof cover is connected to the rotating mechanism mounting base and the lower end of the corrugated dustproof cover is connected to the turret lifting mechanism fixing base to avoid dust accumulation which affects the performance of the turret lifting mechanism.

9. In the present invention, both the rotating mechanism and the swing mechanism of the turret cutting assembly are provided with a limiting device, each limiting device includes two mechanical limiting blocks and two photoelectric inductive switches to provide a double security and ensure an accurate limiting of the rotating mechanism and the swing mechanism.

10. In the present invention, the cutting torch mounting base of the turret cutting assembly is magnetically connected to the arcuate rail, so that the cutting torch is prone to fall down when the cutting torch is hit during work, so as to prevent the cutting torch from being broken in the use, thereby extending the service life of the cutting torch. The upper end of the rotating bracket is provided with a turret cable support bracket which protrudes forward and is configured to wind the cable of the cutting torch, so the present invention is neat and good in appearance.

11. According to the three-cutting-torch cutting assembly of the present invention, for bevel shape cutting, the angle can be adjusted through the deflection mechanism, the spacing between the upper side and lower side and the spacing between the left side and right side can be adjusted through the three-cutting-torch lifting mechanism and translation mechanism, so the angle adjustment is accurate, the adjustment of the spacing between the upper side and lower side and the spacing between the left side and right side is convenient, and the present invention has a high cutting precision and high quality of cutting products. The mechanical height adjusting assembly arranged at the rear end of the three-cutting-torch cutting assembly can sensitively adjust the height of the cutting torch according to the surface roughness of the plate to be cut, so that the damage caused by the collision between the cutting torch and the steel plate can be avoided while the machining accuracy can be improved. The connecting base is provided with a tightening device, the tightening device includes a tightening screw and a tightening knob. During the operation, the cutting torch is fixed by rotating the tightening knob to make the tightening screw closely contact against the upper surface of the main shaft. Therefore, the structure of the present invention is secure while the processing accuracy is improved.

12. In the present invention, the rear end of the three-cutting-torch cutting assembly is connected to a mechanical height adjusting assembly. The mechanical height adjusting assembly includes a main frame. The upper end of the main frame is provided with a mounting seat and the lower end of the main frame is provided with rollers. According to this design, the height of the cutting torch can be sensitively adjusted according to the surface toughness of the plate to be cut. The mounting seat includes a base and a slider, a fixing plate and an optical axis are disposed between the upper baseplate and lower baseplate of the base. The slider and a spring are sleeved on the optical axis. With the spring, the slider and the optical axis, the height of the cutting torch can be flexibly adjusted according to the rough cutting surface, so that the present invention is quickly responsive. The three-cutting-torch cutting assembly is connected to the fixing plate, and the three-cutting-torch cutting assembly moves up and down along with the fluctuation of the fixing plate on the rough cutting surface, so as to flexibly adjust the height of the cutting torch. The upper surface of the main shaft is provided with a scale area, the scale area is provided with tick marks for accurately adjusting the position of the left cutting torch and the right cutting torch, so as to improve the cutting accuracy. Moreover, the scale area is planar, so the tightening screw of tightening device can closely contact against the main shaft easily, and thus the structure is secure and has excellent fixation.

13. In the present invention, the rear end of the parallelogram linkage assembly is connected to the main frame, the rear end of the main frame is connected to the base panel, and the base panel is connected to a driving motor for driving the parallelogram linkage assembly to rotate. By doing so, the driving motor drives the parallelogram linkage assembly to rotate around the main frame, so as to drive the cutting torch to rotate. The worm gear and worm screw provided on the main frame drives the parallelogram linkage assembly to deflect, so as to drive the cutting torch to deflect. With this design, the cutting angle and orientation of the cutting torch are more flexible, and the cutting effect is better.

14. In the present invention, one side of the parallelogram linkage assembly may further be provided with a tracking frame which assists the positioning of the cutting torch. The tracking frame is enabled to move along a direction parallel to the main frame, and one end of the tracking frame near the pipe is provided with a photoelectric inductive sensor. After the cutting machine is started, the photoelectric inductive sensor and the cutting torch on the tracking frame are located side by side. When the photoelectric inductive sensor senses the preset distance, the cutting torch stops to move toward the work piece while the tracking frame automatically withdraws to the position behind the cutting torch. Therefore, the position of the present invention is easier and more accurate, and the present invention has s high degree of automation.

15. The upper end of the parallelogram linkage assembly of the present invention is provided with a linkage assembly auxiliary supporting bracket for winding the extra cables of the cutting torch, so the present invention is neat and good in appearance while the unsafe cutting or product damage caused by messy cables during the cutting can be avoided, thereby improving the safety and quality of cutting.

Figure 1:
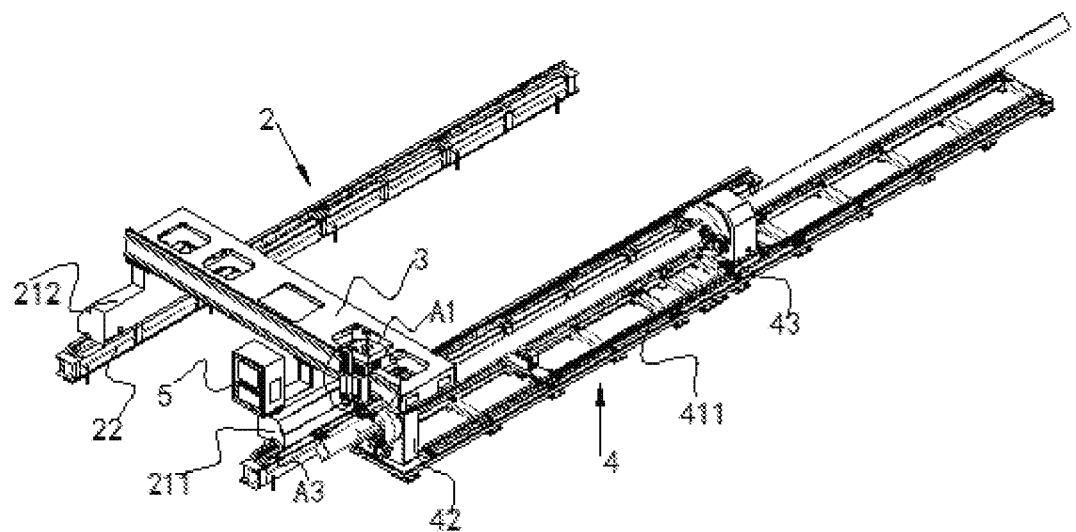
FIG. 1 is the first structural schematic diagram of the present invention (without cutting assembly)

The reference numbers of the parts in the drawings are as follows:

cutting torch 1, plate cutting mechanism 2, main machine frame 211, sub machine frame 212, machine platform 22, second rack 24, second rail 25, crossbeam 3, first gear 31, first rack 32, first rail 34, first roller 35, cutting assembly mounting base 36, pipe cutting mechanism 4, material-loading rail 411, material-loading driving gear 412, material-loading driving rack 413, end chuck 42, moving chuck 43, clamping part 44, clamping roller 46, clamping claw 47, clamping arm 48, arcuate groove 481, first screw 482, main console 5, turret cutting assembly 7, rotating bracket 72, swing motor 73, arcuate rail 74, third gear 75, third rack 76, rotating motor 77, main gear 78, pinion 79, turret lifting motor 710, first mechanical limiting block 711, first photoelectric inductive switch 712, second mechanical limiting block 713, second photoelectric inductive switch 714, cutting torch mounting base 715, rotating assembly cable support bracket 716, corrugated dustproof cover 717, turret lifting mechanism fixing base 718, three-cutting-torch cutting assembly 8, main shaft 81, left cutting torch 82, middle cutting torch 83, right cutting torch 84, connecting shaft 85, connecting base 86, fourth rack 87, lifting adjusting knob 88, clamping part 89, connecting hole 810, worm screw 811, deflection adjusting knob 812, translation adjusting knob 814, tightening screw 815, tightening knob 816, mechanical height adjusting assembly 817, height adjusting assembly main frame 818, height adjusting assembly mounting seat 819, height adjusting assembly slider 8191, upper baseplate 8192, lower baseplate 8193, height adjusting assembly fixing plate 8195, optical axis 8194, spring 8196, rear portion connecting shaft 8197, height adjusting assembly roller 820, scale area 821, handle 822, parallelogram linkage assembly 9, main frame 91, base panel 93, and linkage assembly cable auxiliary bracket 94.

DETAILED DESCRIPTION OF THE INVENTION

The following embodiments are used to illustrate the present invention rather than limiting the scope of the present invention. Any modification or substitution of the method, procedures or conditions of the present invention without departing from the spirit and essence of the present invention fall within the protection scope of the present invention.

In the present invention, unless oppositely stated, the terms such as "up, down, left and right" used to indicate the orientation or positional relationship are based on the orientation or positional relationship shown in the drawings, and the terms "inside", "outside" refer to the interior or exterior of the outline of respective part. These terms are used for easy understanding and should not be construed as limiting the scope of the present invention.

Embodiment

Figure 2:
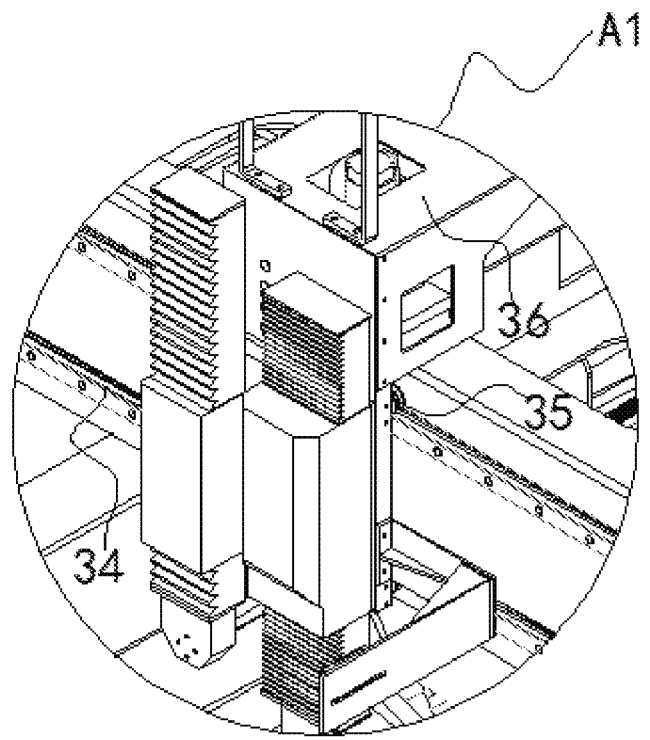
FIG. 2 is an enlarged view of A1 in FIG. 1.
Figure 3:
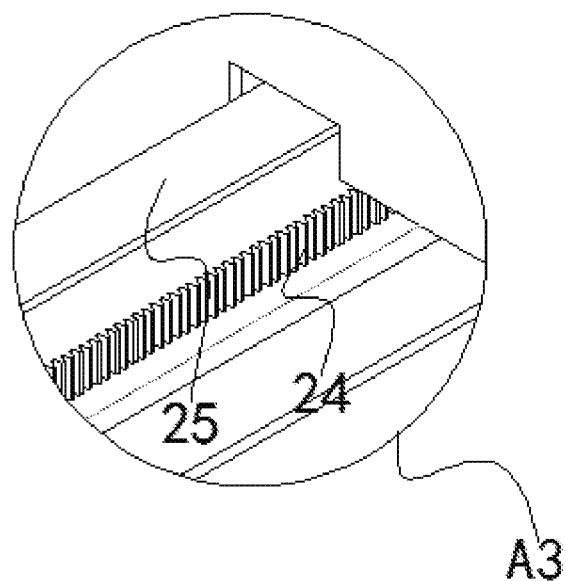
FIG. 3 is an enlarged view of A3 in FIG. 1.
Figure 4:
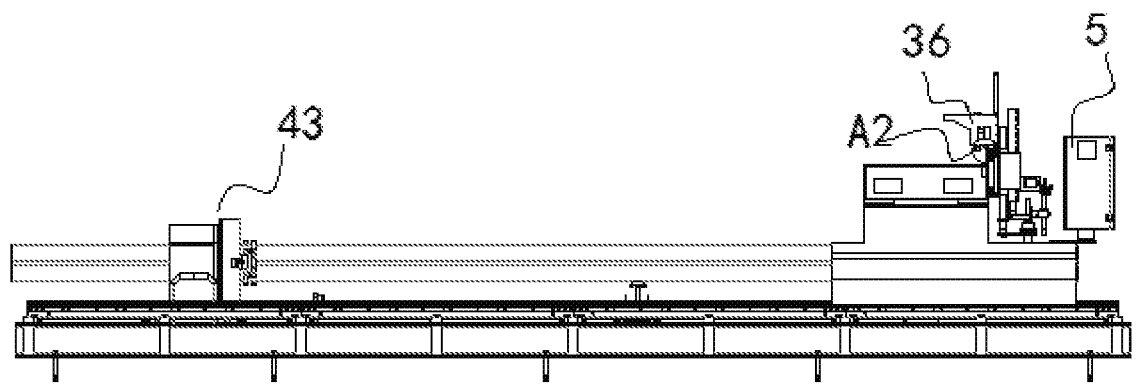
FIG. 4 is the second structural schematic diagram of the present invention, (without cutting assembly)
Figure 5:
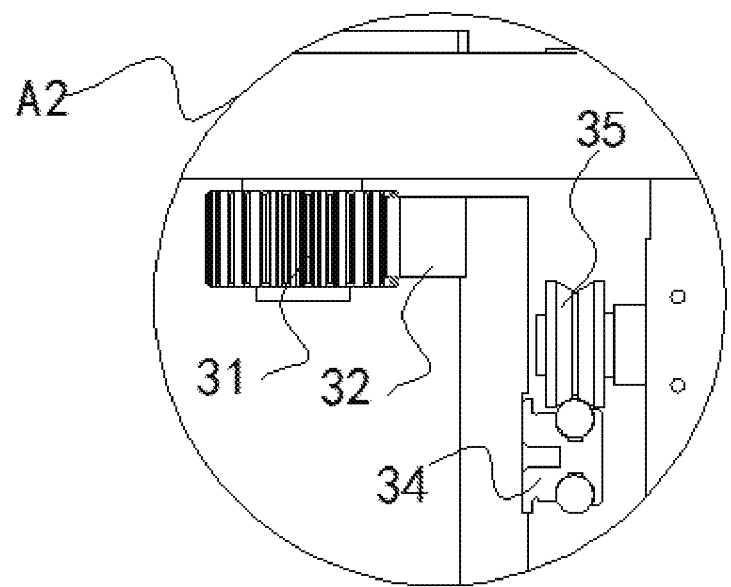
FIG. 5 is an enlarged view of A2 in FIG. 4.
Figure 6:
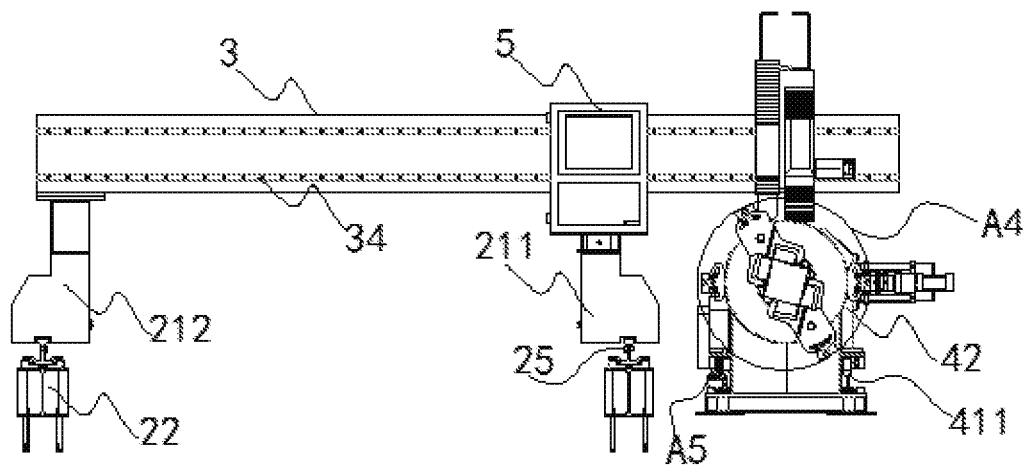
FIG. 6 is the third structural schematic diagram of the present invention (without cutting assembly)
Figure 7:
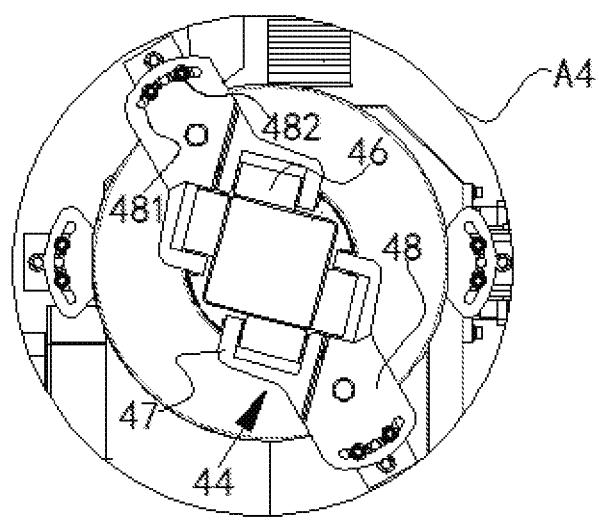
FIG. 7 is an enlarged view of A4 in FIG. 6.
Figure 8:
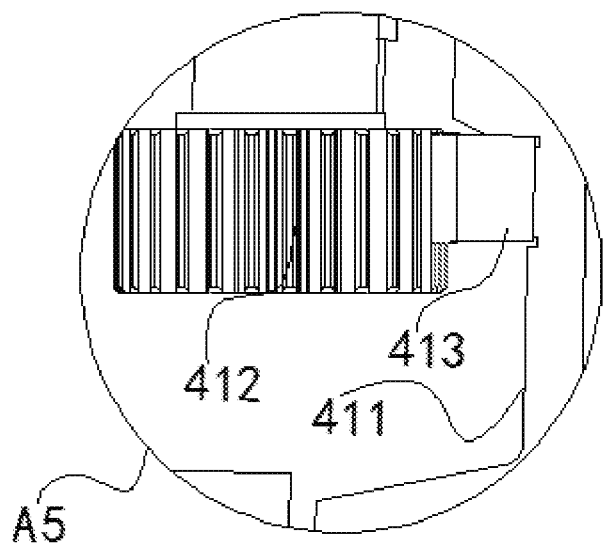
FIG. 8 is an enlarged view of A5 in FIG. 6.
Figure 9:
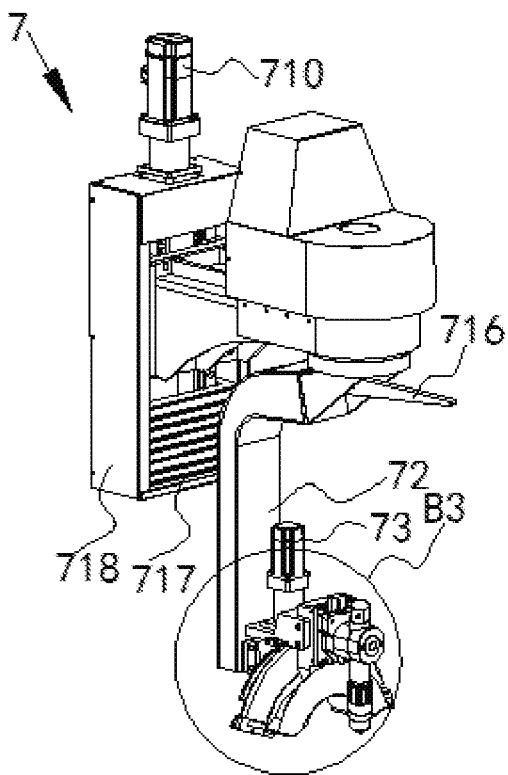
FIG. 9 is the first structural schematic diagram of the turret cutting assembly of the present invention.
Figure 10:
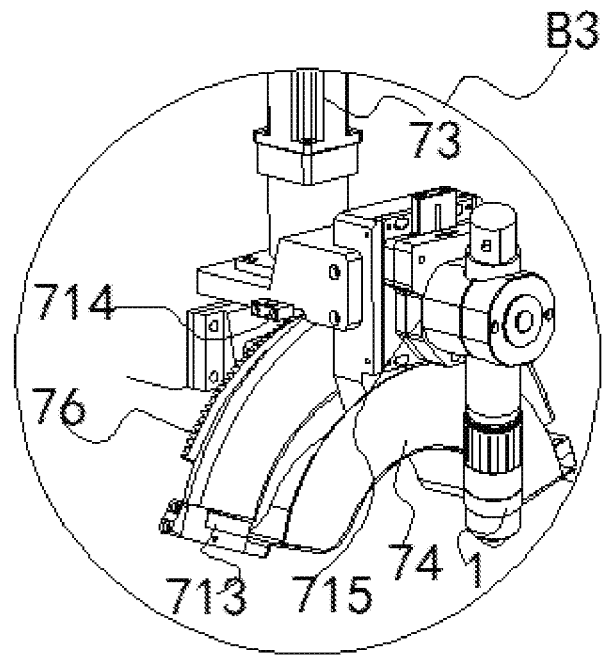
FIG. 10 is an enlarged view of B3 in FIG. 9.
Figure 11:
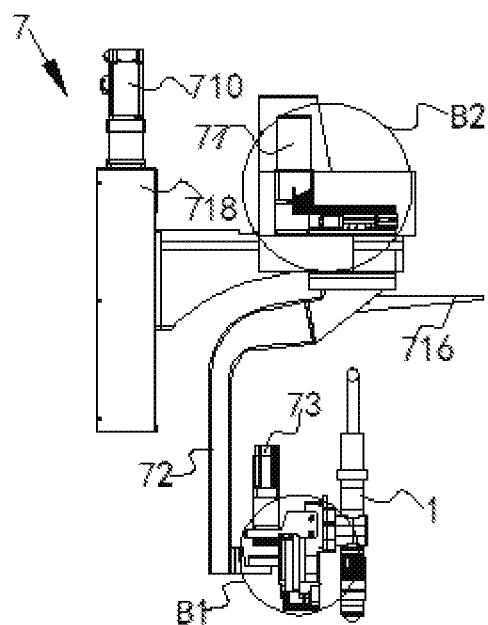
FIG. 11 is the second structural schematic diagram of the turret cutting assembly of the present invention.
Figure 12:
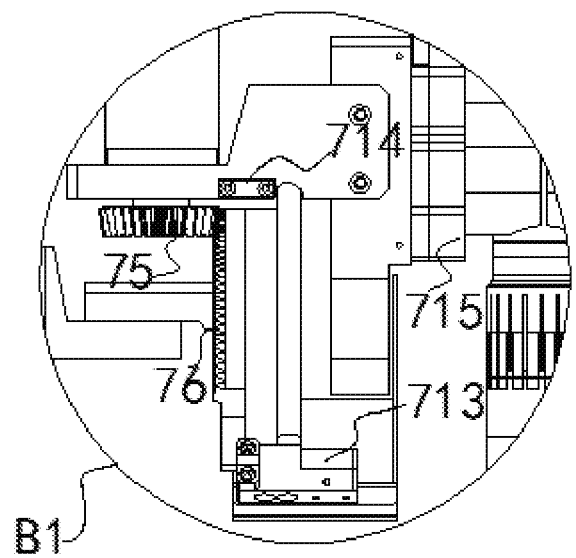
FIG. 12 is an enlarged view of B1 in FIG. 11.
Figure 13:
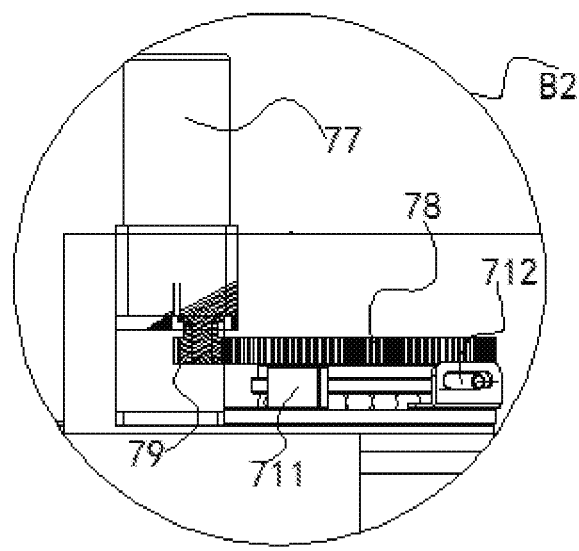
FIG. 13 is an enlarged view of B2 in FIG. 11.
Figure 14:
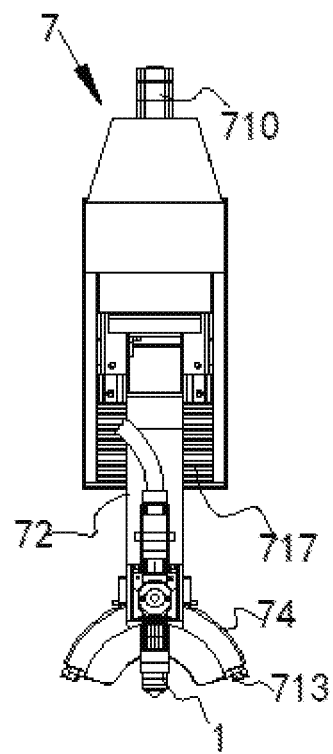
FIG. 14 is the third structural schematic diagram of the turret cutting assembly of the present invention.
Figure 15:
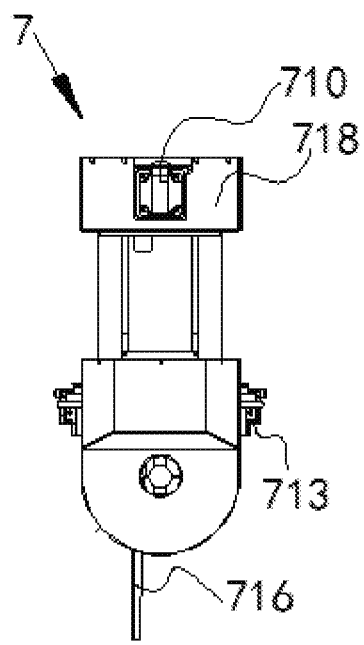
FIG. 15 is the fourth structural schematic diagram of the turret cutting assembly of the present invention.
Figure 16:
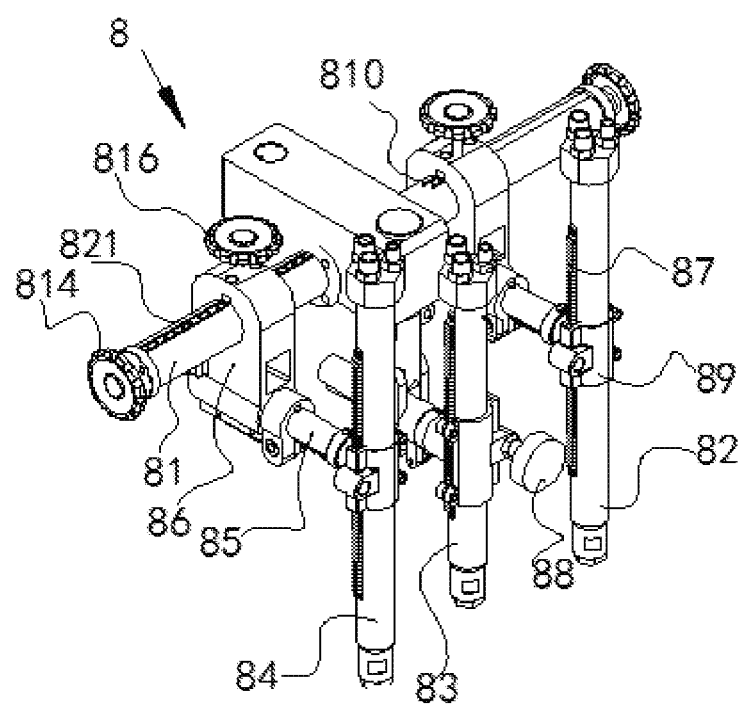
FIG. 16 is the first structural schematic diagram of the three-cutting-torch cutting assembly of the present invention (without the mechanical height adjusting assembly)
Figure 17:
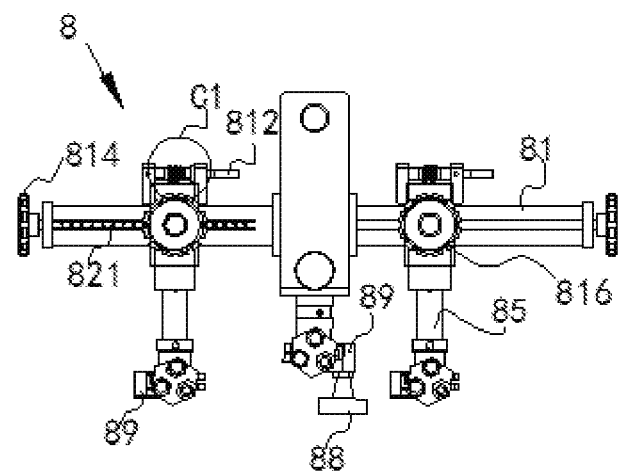
FIG. 17 is the second structural schematic diagram of the three-cutting-torch cutting assembly of the present invention (without the mechanical height adjusting assembly)
Figure 18:
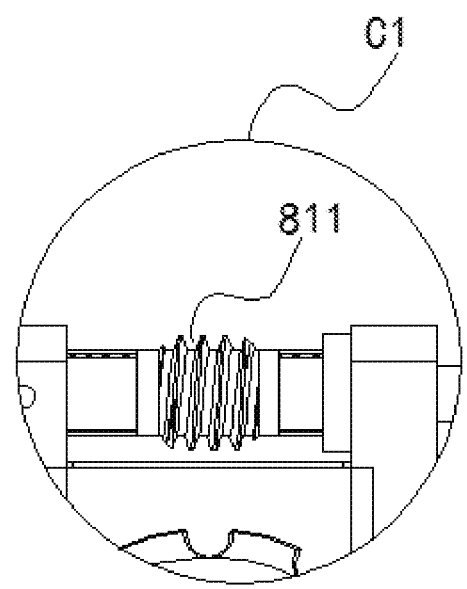
FIG. 18 is an enlarged view of C1 in FIG. 17.
Figure 19:
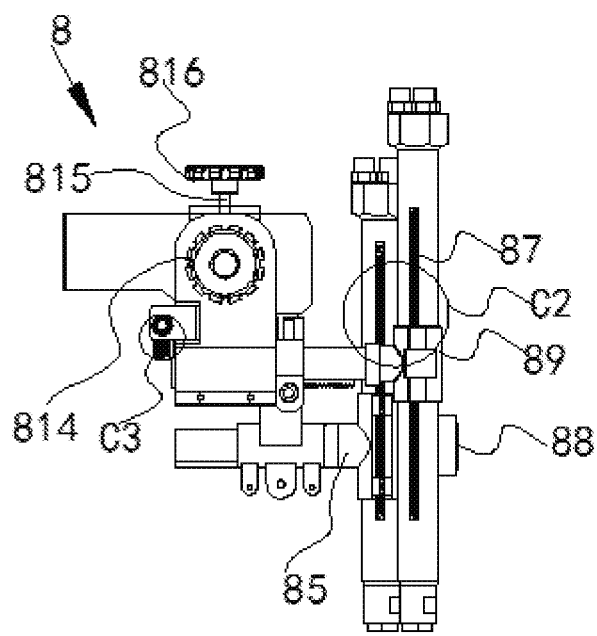
FIG. 19 is the third structural schematic diagram of the three-cutting-torch cutting assembly of the present invention (without the mechanical height adjusting assembly)
Figure 20:
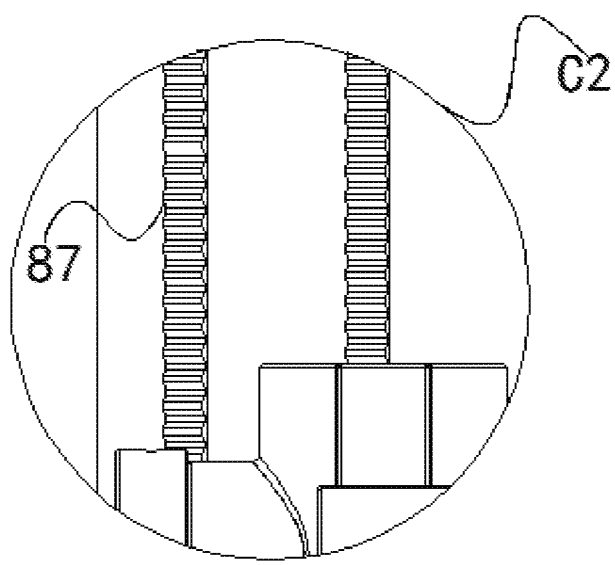
FIG. 20 is an enlarged view of C2 in FIG. 19.
Figure 21:
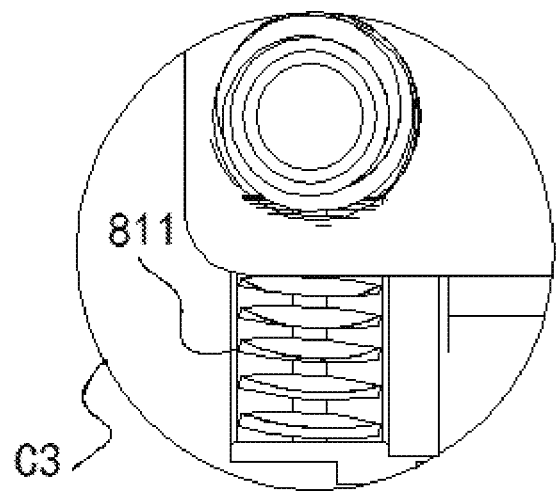
FIG. 21 is an enlarged view of C3 in FIG. 19.
Figure 22:
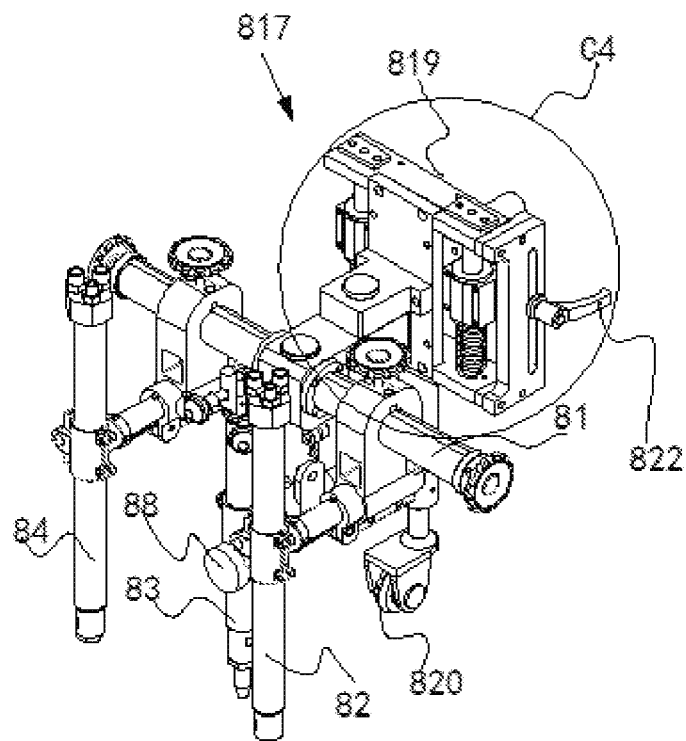
FIG. 22 is the fourth structural schematic diagram of the three-cutting-torch cutting assembly of the present invention (without the mechanical height adjusting assembly)
Figure 23:
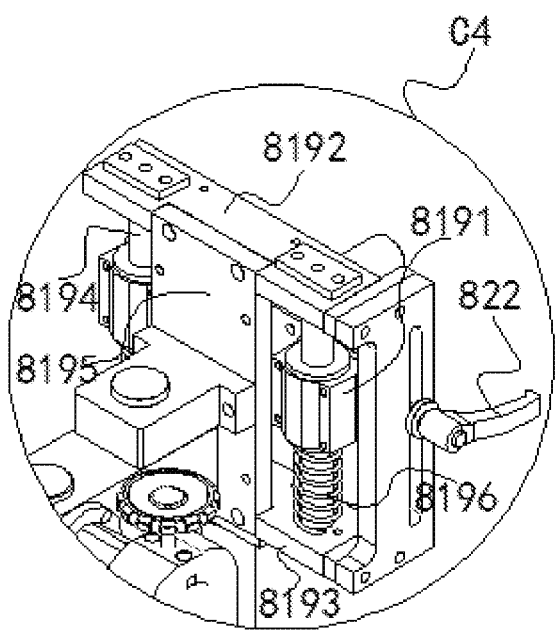
FIG. 23 is an enlarged view of C4 in FIG. 22.
Figure 24:
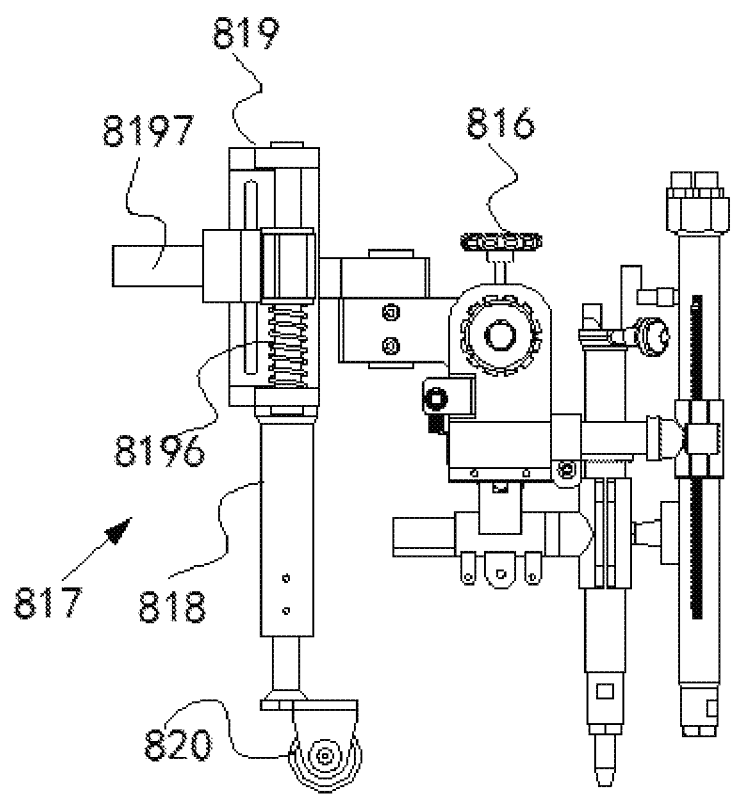
FIG. 24 is the fifth structural schematic diagram of the three-cutting-torch cutting assembly of the present invention (without the mechanical height adjusting assembly)
Figure 25:
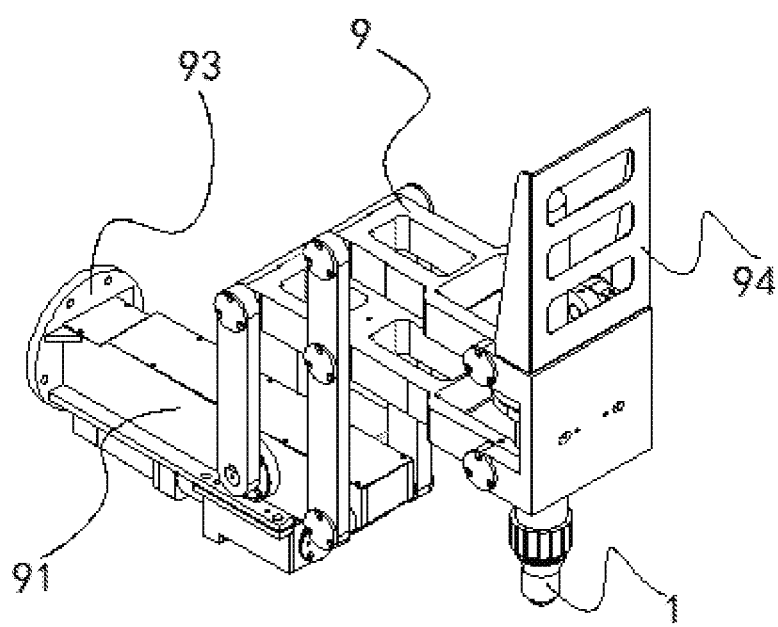
FIG. 25 is a structural schematic diagram of the parallelogram linkage assembly of the present invention.

As shown in FIG. 1 to FIG. 25, a gantry cutting machine for pipe and flat plate includes at least one cutting assembly, plate cutting mechanism 2, pipe cutting mechanism 4 for cutting rectangular pipes and crossbeam 3. The plate cutting mechanism and the pipe cutting mechanism are arranged side by side, the crossbeam is located above the plate cutting mechanism and the pipe cutting mechanism, and the end provided with a cutting torch is defined as front end.

The crossbeam is provided with a transverse driving unit for driving the cutting assembly to move along a length direction of the crossbeam, the cutting assembly is connected to the crossbeam through cutting assembly mounting base 36, and the cutting assembly mounting base is provided with a lifting-driving unit for driving the cutting assembly to move up and down.

The transverse driving unit includes first gear 31, first rack 32, first motor, and first rail 34. The first gear and the first rack are engaged with each other, the first rack and the first rail are both disposed on the crossbeam along a length direction of the crossbeam, an output shaft of the first motor is connected to an input end of the first gear, and the first motor drives the first gear to rotate along the first rack, so as to drive the cutting assembly mounting base to slide along the first rail.

The plate cutting mechanism includes a machine frame, machine platform 22 and a vertical driving unit which drives the machine frame to move along a length direction of the machine platform. The machine frame includes main machine frame 211 and sub machine frame 212, wherein the main machine frame and the sub machine frame are located above the machine platform, two ends of the crossbeam are fixedly connected to the main machine frame and the sub machine frame, respectively, and one end of the crossbeam extends to a position above the pipe cutting mechanism. The vertical driving unit is arranged on the machine frame.

The vertical driving unit includes second gear, second rack 24, second rail 25 and second motor. The second rack and the second rail are arranged on the machine platform, the second gear is arranged at a lower end of the machine frame, the second gear is connected to an output shaft of the second motor, and the second motor drives the machine frame to move along the second rail.

The pipe cutting mechanism includes material-loading rail 411, end chuck 42, moving chuck 43 and material-loading driving unit. The end chuck is fixedly connected to one end of the material-loading rail, the moving chuck is connected to the material-loading rail through the material-loading driving unit and is enabled to move along a length direction of the material-loading rail. The end chuck and the moving chuck are arranged coaxially. When a pipe is cut, one end of the pipe is snapped in the end chuck and the other end of the pipe is snapped in the moving chuck.

The end chuck and the moving chuck each includes two clamping parts 44 for clamping the pipe, a clamping part mounting base and a chuck body. The two clamping parts are symmetrically arranged on both sides of the pipe and fixedly connected to the chuck body, respectively. The pipe is clamped when the two clamping parts move close to the pipe at the same time. The clamping part includes clamping claw 47 in contact with the pipe and clamping arm 48 fixedly connected to the clamping claw. The clamping arm is connected to the clamping part mounting base, the clamping part mounting base is fixedly connected to the chuck body. Two ends of the clamping claw are respectively provided with clamping roller 46, and the two clamping rollers are arranged at an angle of 90 degrees. One end of the clamping roller is connected to the clamping claw and the other end of the clamping roller is connected to the clamping arm. During cutting, the pipe is located between the two clamping rollers and is enabled to slide between the two clamping rollers.

Two cutting assemblies are provided and both are arranged on the cutting assembly mounting base. The cutting assemblies are turret cutting assembly 7, three-cutting-torch cutting assembly 8 or parallelogram linkage assembly 9, respectively.

In one embodiment of the present invention, turret cutting assembly 7 includes cutting torch 1, swing mechanism for driving the cutting torch to swing leftward and rightward, rotating mechanism for driving the cutting torch to rotate, turret lifting mechanism for driving the cutting torch to move up and down, and rotating bracket 72. An upper end of the rotating bracket is rotatably connected to the rotating mechanism and a lower end of the rotating bracket is fixedly connected to the swing mechanism. The swing mechanism is located behind the cutting torch. The rotating mechanism is located above the swing mechanism. The turret lifting mechanism is located behind the rotating mechanism. The swing mechanism includes swing motor 73, arcuate rail 74, third gear 75, and third rack 76 engaged with the third gear. The swing motor is located above the arcuate rail, the cutting torch is connected to the arcuate rail through cutting torch mounting base 715, the arcuate rail is located between the swing motor and the cutting torch, and the third rack is mounted on the arcuate rail along a length direction of the arcuate rail. The third gear is disposed at an output end of the swing motor, and the swing motor drives the third gear to rotate along the third rack, so as to drive the cutting torch to swing leftward and rightward. The rotating mechanism includes rotating motor 77 and a gear set. The gear set includes main gear 78 and pinion 79 which are engaged with each other. The pinion is connected to an output end of the rotating motor, the main gear is connected to an upper end of the rotating bracket. The rotating motor drives the pinion to drive the rotating bracket to rotate, so as to drive the cutting torch to rotate around the axis of the main gear. The turret lifting mechanism includes turret lifting motor 710 and a ball screw. The ball screw includes a third screw and a third nut. The turret lifting motor is fixedly connected to the third screw. A mounting base of the rotating mechanism is fixedly connected to the third nut. The turret lifting motor drives the third screw to rotate, so as to drive the third nut to move up and down, and thus to drive the rotating mechanism to move up and down. The rotating mechanism is provided with a rotation limiting device, and the swing mechanism is provided with a swing limiting device.

The rotation limiting device includes first mechanical limiting block 711 and first photoelectric inductive switch 712. Two first mechanical limiting blocks are provided and are symmetrically arranged on the left and right sides of the main gear, respectively. Two first photoelectric inductive switches are disposed between the two first mechanical limiting blocks, and the two first photoelectric inductive switches are positioned close to the first mechanical limiting blocks on both sides, respectively.

The swing limiting device includes second mechanical limiting block 713 and second photoelectric inductive switch 714. Two second mechanical limiting blocks are provided and symmetrically arranged at left and right ends of the arcuate rail, respectively. Two second photoelectric inductive switches are disposed between the two second mechanical limiting blocks, and the two second photoelectric inductive switches are positioned close to the second mechanical limiting blocks on both sides, respectively.

The cutting torch mounting base 715 is magnetically connected to the arcuate rail.

The third gear of the swing mechanism is a bevel gear.

Rotating assembly cable support bracket 716 protruding forward is provided at an upper end of the rotating bracket and below the rotating mechanism.

Corrugated dustproof cover 717 is provided on the side where turret lifting mechanism fixing base 718 contacts the rotating mechanism mounting base, the upper end of the corrugated dustproof cover is connected to the rotating mechanism mounting base, and the lower end of the corrugated dustproof cover is connected to the turret lifting mechanism fixing base.

According to another embodiment of the present invention, three-cutting-torch cutting assembly 8 includes hollow main shaft 81 and cutting torch 1. Three cutting torches are provided, including left cutting torch 82, middle cutting torch 83 and right cutting torch 84, respectively, from left to right. The left cutting torch and the right cutting torch are respectively connected to the main shaft through left connecting mechanism and right connecting mechanism, and the middle cutting torch is connected to the main shaft through a middle connecting mechanism. The front ends of the left connecting mechanism, the right connecting mechanism and the middle connecting mechanism are each provided with a three-cutting-torch lifting mechanism which drives the cutting torches to move up and down. Further, the left connecting mechanism and the right connecting mechanism each includes a deflection mechanism for driving the cutting torch to deflect at an angle and a translation mechanism for driving the cutting torch to move leftward and rightward. The deflection mechanism is disposed behind the cutting torch, and the translation mechanism is disposed above the deflection mechanism.

The left connecting mechanism, the right connecting mechanism and the middle connecting mechanism each includes connecting shaft 85 and connecting base 86. A front end of the connecting shaft is connected to the cutting torch, and a rear end of the connecting shaft is connected to the connecting base. The upper end of the connecting base is connected to the main shaft.

The three-cutting-torch lifting mechanism includes a fourth gear, fourth rack 87 and lifting adjusting knob 88, wherein the fourth gear and the fourth rack are engaged with each other. The lifting adjusting knob is fixedly connected to the fourth gear, and the fourth rack is disposed on the cutting torch along the length direction of the cutting torch. The fourth gear is disposed at clamping part 89 which is located at a front end of the connecting shaft, and the lifting adjusting knob drives the cutting torch to move up and down by adjusting the forward or reverse rotation of the fourth gear.

The left connecting mechanism and the right connecting mechanism each includes connecting shaft 85 and connecting base 86. The front end of the connecting shaft is connected to the cutting torch and a rear end of the connecting shaft is connected to the connecting base. The upper end of the connecting base is provided with connecting hole 810, and the main shaft passes through the connecting hole of the connecting base and is slidably connected to the connecting base.

The deflection mechanism includes worm gear, worm screw 811 and deflection adjusting knob 812, wherein the worm gear and worm screw are engaged with each other. The worm gear is arranged at the rear end of the connecting shaft, the worm screw is arranged at the rear-upper end of the connecting shaft. One end of the worm screw is fixedly connected to the deflection adjusting knob, and the deflection adjusting knob drives the cutting torch to deflect leftward and rightward with an angle by adjusting the forward or reverse rotation of the worm screw.

The translation mechanism includes a screw rod, a nut and translation adjusting knob 814, wherein the screw rod and the nut are engaged with each other. One end of the screw rod extends into the interior of the main shaft and the other end of the screw rod is fixedly connected to the translation adjusting knob arranged outside. The translation adjusting knob drives the cutting torch to move leftward and rightward by adjusting the forward or reverse rotation of the screw rod.

The connecting base is provided with a tightening device, the tightening device includes tightening screw 815 and tightening knob 816.

The upper end of the connecting base is provided with a tightening screw hole extending downward from the upper end surface of the connecting base to the connecting hole. The upper end of the tightening screw is fixedly connected to the tightening knob and the lower end of the tightening screw passes through the tightening screw hole. During the tightening, the tightening screw contacts against the upper surface of the main shaft by rotating the tightening knob.

The rear end of the three-cutting-torch cutting assembly is connected to mechanical height adjusting assembly 817. The mechanical height adjusting assembly includes height adjusting assembly main frame 818, an upper end of the height adjusting assembly main frame is provided with height adjusting assembly mounting seat 819 and the lower end of the height adjusting assembly main frame is provided with height adjusting assembly roller 820.

The height adjusting assembly mounting seat includes a height adjusting assembly base and height adjusting assembly slider 8191. The height adjusting assembly base includes upper baseplate 8192, lower baseplate 8193 and height adjusting assembly fixing plate 8195, wherein the height adjusting assembly fixing plate is located between the upper baseplate and the lower baseplate, and is integrally connected to the upper baseplate and the lower baseplate. The left and right sides of height adjusting assembly fixing plate are respectively provided with optical axis 8194. The upper end of the optical axis is integrally connected to the upper baseplate, and the lower end of the optical axis is integrally connected to the lower baseplate. The optical axis is sleeved with height adjusting assembly slider 8191 and spring 8196. The upper end of the spring is connected to the height adjusting assembly slider and the lower end of the spring is connected to the lower baseplate.

Rear portion connecting shaft 8197 connected to the machine tool is arranged at the rear portion of the height adjusting assembly mounting seat. The rear portion connecting shaft is integrally connected to the height adjusting assembly sliders on the optical axes located at the left and right sides, respectively.

The left side of the height adjusting assembly mounting seat is provided with handle 822. When the cutting is completed, the height of the cutting torch is fixed by compressing the spring through the handle.

The upper surfaces of the two ends of main shaft 81 are provided with scale areas 821 extending from the two ends to the middle until the middle connecting mechanism, and the scale areas are provided with scale marks.

The scale areas are planar.

According to another embodiment of the present invention, the rear end of parallelogram linkage assembly 9 is connected to main frame 91, the rear end of the main frame 93 is connected to base panel 93, the front portion of the parallelogram linkage assembly is connected to the cutting torch, and the base panel is connected to a driving motor for driving the parallelogram linkage assembly to rotate.

One side of the parallelogram linkage assembly is provided with a tracking frame parallel with main frame 91, the tracking frame is connected to the fixed arm assembly and can move in a direction parallel to the main frame. An end of the tracking frame near the pipe is provided with a second photoelectric inductive sensor.

The front-upper end of the driving parallelogram linkage assembly is provided with linkage assembly cable auxiliary bracket 94 for winding the cables of the cutting torch.

The tail end of clamping arm 48 is provided with arcuate groove 481 for adjusting the angle of the clamping arm, and the connection between the clamping arm and the clamping part mounting base is realized by locking the arcuate groove through first screw 482.

The deflection angle adjustment of the clamping arm is realized by locking the arcuate groove at different positions through the first screw rod. The drive manner of the lifting-driving unit is a gear-rack transmission.

The material-loading driving unit includes material-loading driving gear 412, material-loading driving rack 413, material-loading rail 411 and a material-loading driving motor. The material-loading driving rack is arranged on the material-loading rail, the material-loading driving gear is arranged at the lower end of the moving chuck. The material-loading driving gear is connected to the output shaft of the material-loading driving motor, and the material-loading driving motor drives the moving chuck to move along the material-loading rail.

The cutting torch is a plasma cutting torch or a flame cutting torch.

The main machine frame is arranged on the machine platform and located on a side near the pipe cutting mechanism. The main machine frame is provided with main console 5.

The manner for realizing the rotation of the end chuck and the moving chuck is gear transmission.

The gear transmission structures of the end chuck and the moving chuck are respectively connected to a synchronous motor.

The manner for realizing the rotational connection between the main frame and the parallelogram linkage assembly is worm-gear and worm screw transmission.

One cutting assembly mounting base is provided, and each of the cutting assemblies is mounted on the cutting assembly mounting base.

At least one cutting assembly mounting base is provided, and each of the cutting assembly mounting bases is correspondingly provided with a cutting assembly. Each of the cutting assemblies is respectively connected to a first gear and a first motor that drive the cutting assembly mounting base to move along the crossbeam, and a lifting-driving unit that drives the cutting assembly to move up and down.

Two first rails are provided and arranged on the same side of the crossbeam. The rear end of the cutting assembly mounting base is provided with first roller 35 which is matched with the first rail. The cutting assembly mounting base is snapped in the first rail through the first roller and is driven by the first motor to move along the length direction of the crossbeam.

Further, a control system is also provided. The cutting torch, the first motor, the second motor, the swing motor, the rotating motor, the turret lifting motor, the material-loading driving motor, the driving motor and the synchronous motor are electrically connected to the control system, respectively.

The working principles of the present invention are as follows.

For the flat plate cutting: the metal plate material to be cut is placed on the work bench, then start the cutting machine, under the control of the control system, the second motor of the vertical driving unit drives the crossbeam to drive the cutting assembly to move along the second rail, and the first motor of the transverse driving unit drives the cutting assembly mounting base to drive the cutting assembly to move along the first rail until to a position above the metal plate; the lifting-driving unit drives the cutting assembly to move up and down, so a flexible three-dimensional cutting of work pieces is realized, and the structure is stable and secure with a high degree of automation.

For the pipe cutting: after the pipe is snapped in the end chuck and the moving chuck, the cutting machine is started, under the control of the control system, the second motor of the vertical driving unit drives the crossbeam to drive the cutting assembly to move along the second rail, the first motor of the transverse driving unit drives the cutting assembly mounting base to drive the cutting assembly to move along the first rail until to a position above the pipe; then, the orientation and angle of the cutting assembly is adjusted to cut the pipe. The material-loading driving unit automatically delivers the pipe material until the pipe cutting is completed during the pipe cutting. The present invention has the advantages such as high cutting efficiency, smooth cut, high cutting efficiency, and the structure is stable and secure with a high degree of automation. Obviously, the foregoing embodiments are merely examples for clear description of the present invention rather than the limitation of the embodiments. For those skilled in the art, other different forms of changes or variations may be derived based on the foregoing descriptions. Here, the embodiments shown are not exhaustive. The obvious changes or variations derived therefrom still fall within the scope of the present invention.

What is claimed is:

1. A gantry cutting machine for pipe and flat plate, comprising: at least one cutting assembly, a plate cutting mechanism, a pipe cutting mechanism for cutting rectangular pipes and a crossbeam; wherein the plate cutting mechanism and the pipe cutting mechanism are arranged side by side, the crossbeam is located above the plate cutting mechanism and the pipe cutting mechanism, and an end of cutting assembly is provided with a cutting torch is defined as a front end;

the crossbeam is provided with a transverse driving unit for driving the cutting assembly to move along a length direction of the crossbeam, the cutting assembly is connected to the crossbeam through a cutting assembly mounting base, and the cutting assembly mounting base is provided with a lifting-driving unit for driving the cutting assembly to move up and down;

the transverse driving unit further comprises a first gear, a first rack, a first motor, and a first rail), wherein the first gear and the first rack are engaged with each other, the first rack and the first rail are both disposed on the crossbeam along the length direction of the crossbeam, an output shaft of the first motor is connected to an input end of the first gear, and the first motor drives the first gear to rotate along the first rack, so as to drive the cutting assembly mounting base to slide along the first rail;

the plate cutting mechanism further comprises a machine frame, a machine platform and a vertical driving unit for driving the machine frame to move along a length direction of the machine platform; the machine frame further comprises a main machine frame and a sub machine frame, wherein the main machine frame and the sub machine frame are located above the machine platform, two ends of the crossbeam are fixedly connected to the main machine frame and the sub machine frame, respectively, one end of the crossbeam extends to a position above the pipe cutting mechanism, and the vertical driving unit is arranged on the machine frame;

the vertical driving unit further comprises a second gear, a second rack, a second rail and a second motor, wherein the second rack and the second rail are arranged on the machine platform, the second gear is arranged at a lower end of the machine frame; the second gear is connected to an output shaft of the second motor, and the second motor drives the machine frame to move along the second rail;

the pipe cutting mechanism further comprises a material-loading rail, an end chuck, a moving chuck and a material-loading driving unit, wherein the end chuck is fixedly connected to an end of the material-loading rail, the moving chuck is connected to the material-loading rail through the material-loading driving unit and is enabled to move along a length direction of the material-loading rail, and the end chuck and the moving chuck are coaxially arranged; when a pipe is cut, one end of the pipe is snapped in the end chuck and the other end of the pipe is snapped in the moving chuck;

each of the end chuck and the moving chuck comprises two clamping parts configured for clamping the pipe, a clamping part mounting base and a chuck body, wherein the two clamping parts are symmetrically arranged on both sides of the pipe and respectively connected to the chuck body, the pipe is clamped when the two clamping parts move close to the pipe, simultaneously; the two clamping parts each comprises a clamping claw in contact with the pipe and a clamping arm fixedly connected to the clamping claw; the clamping arm is connected to the clamping part mounting base; the clamping part mounting base is fixedly connected to the chuck body; two ends of the clamping claw are respectively provided with a clamping roller, two clamping rollers are arranged at an angle of 90 degrees, a first end of the clamping roller is connected to the clamping claw and a second of the clamping roller is connected to the clamping arm, when the pipe is cut, the pipe is located between the two clamping rollers and is enabled to slide between the two clamping rollers.

2. The gantry cutting machine for pipe and flat plate according to claim 1, wherein two cutting assemblies are provided and both are arranged on the cutting assembly mounting base, and the two cutting assemblies are is one of a group consisting of, a turret cutting assembly, a three-cutting-torch cutting assembly or a parallelogram linkage assembly.

3. The gantry cutting machine for pipe and flat plate according to claim 2, wherein the turret cutting assembly further comprises the cutting torch, a swing mechanism for driving the cutting torch to swing leftward and rightward, a rotating mechanism for driving the cutting torch to rotate, a turret lifting mechanism for driving the cutting torch to move up and down, and a rotating bracket); wherein, an upper end of the rotating bracket is connected to the rotating mechanism and a lower end of the rotating bracket is connected to the swing mechanism; the swing mechanism is located behind the cutting torch; the rotating mechanism is located above the swing mechanism; the turret lifting mechanism is located behind the rotating mechanism; the swing mechanism further comprises a swing motor, an arcuate rail, a third gear, and a third rack engaged with the third gear; wherein, the swing motor is located above the arcuate rail, the cutting torch is connected to the arcuate rail through a cutting torch mounting base, the arcuate rail is located between the swing motor and the cutting torch, and the third rack is mounted on the arcuate rail along a length direction of the arcuate rail; the third gear is disposed at an output end of the swing motor, the swing motor drives the third gear to rotate along the third rack, so as to drive the cutting torch to swing leftward and rightward; the rotating mechanism further comprises a rotating motor and a gear set, wherein the gear set comprises a main gear and a pinion, the pinion is connected to the an output end of the rotating motor, the main gear is connected to an upper end of the rotating bracket; the rotating motor drives the pinion to make the rotating bracket rotate, so as to drive the cutting torch to rotate around an axis of the main gear; the turret lifting mechanism further comprises a turret lifting motor and a ball screw, wherein the ball screw comprises a third screw and a third nut, the turret lifting motor is fixedly connected to the third screw; a mounting base of the rotating mechanism is fixedly connected to the third nut, the turret lifting motor drives the third screw to rotate, so as to drive the third nut to move up and down, and thus to drive the rotating mechanism to move up and down; the rotating mechanism is provided with a rotation limiting device, and the swing mechanism is provided with a swing limiting device.

4. The gantry cutting machine for pipe and flat plate according to claim 2, wherein the three-cutting-torch cutting assembly comprises a hollow main shaft and three cutting torches, wherein the three cutting torches are provided including a left cutting torch, a middle cutting torch and a right cutting torch from the left to the right, the left cutting torch and the right cutting torch are respectively connected to the main shaft through a left connecting mechanism and a right connecting mechanism, the middle cutting torch is connected to the main shaft through a middle connecting mechanism; front ends of the left connecting mechanism, the right connecting mechanism and the middle connecting mechanism are each provided with a three-cutting-torch lifting mechanism for driving respective cutting torch to move up and down; the left connecting mechanism and the right connecting mechanism each comprises a deflection mechanism for driving the cutting torch to deflect at an angle and a translation mechanism for driving the cutting torch to move leftward and rightward, the deflection mechanism is disposed behind the cutting torch, and the translation mechanism is disposed above the deflection mechanism.

5. The gantry cutting machine for pipe and flat plate according to claim 2, wherein a rear end of the parallelogram linkage assembly is connected to a main frame, a rear end of the main frame is connected to a base panel; a front portion of the parallelogram linkage assembly is connected to the cutting torch, and the base panel is connected to a driving motor for driving the parallelogram linkage assembly to rotate.

6. The gantry cutting machine for pipe and flat plate according to claim 1, wherein a tail end of the clamping arm is provided with an arcuate groove for adjusting an angle of the clamping arm, and the clamping arm is connected to the clamping part mounting base by locking the arcuate groove through a first screw.

7. The gantry cutting machine for pipe and flat plate according to claim 1, wherein a driving manner of the lifting-driving unit is gear-rack transmission.

8. The gantry cutting machine for pipe and flat plate according to claim 1, wherein the material-loading driving unit comprises a material-loading driving gear, a material-loading driving rack and a material-loading driving motor; wherein the material-loading driving rack is arranged on the material-loading rail, the material-loading driving gear is arranged at a lower end of the moving chuck, the material-loading driving gear is connected to an output shaft of the material-loading driving motor, and the material-loading driving motor drives the moving chuck to move along the material-loading rail.

9. The gantry cutting machine for pipe and flat plate according to claim 3, wherein the cutting torch is a plasma cutting torch or a flame cutting torch.

10. The gantry cutting machine for pipe and flat plate according to claim 1, wherein the main machine frame is mounted on the machine platform at a side close to the pipe cutting mechanism, and the main machine frame is provided with a main console.

11. The gantry cutting machine for pipe and flat plate according to claim 4, wherein the cutting torch is one of a group consisting of, a plasma cutting torch or a flame cutting torch.

12. The gantry cutting machine for pipe and flat plate according to claim 5, wherein the cutting torch is one of a group consisting of, a plasma cutting torch or a flame cutting torch.

* * * * *